(12) United States Patent
Jorgensen

(10) Patent No.: US 8,528,774 B2
(45) Date of Patent: Sep. 10, 2013

(54) FUEL COOLER ASSEMBLY

(75) Inventor: Iner M. Jorgensen, Renton, WA (US)

(73) Assignee: PACCAR Inc, Bellevue, WA (US)

(*) Notice: Subject to any disclaimer, the term of this patent is extended or adjusted under 35 U.S.C. 154(b) by 283 days.

(21) Appl. No.: 13/157,766

(22) Filed: Jun. 10, 2011

(65) Prior Publication Data

US 2012/0312500 A1 Dec. 13, 2012

(51) Int. Cl.
*B60P 3/00* (2006.01)
(52) U.S. Cl.
USPC ............ 220/563; 123/541; 123/563; 220/562
(58) Field of Classification Search
USPC .................. 123/514, 541, 563; 220/562–564
See application file for complete search history.

(56) References Cited

U.S. PATENT DOCUMENTS

| | | | | |
|---|---|---|---|---|
| 6,491,180 | B2 * | 12/2002 | Distelhoff et al. | 220/562 |
| 6,612,458 | B2 * | 9/2003 | Balzer et al. | 220/562 |
| 6,661,339 | B2 * | 12/2003 | Muirhead | 340/505 |
| 6,957,542 | B1 | 10/2005 | Kido | |
| 7,600,506 | B2 | 10/2009 | Kopinsky | |
| 2002/0047015 | A1 | 4/2002 | Distelhoff | |
| 2002/0053566 | A1 | 5/2002 | Balzer | |
| 2006/0011173 | A1 | 1/2006 | Davis | |
| 2006/0068139 | A1 | 3/2006 | Fujitaka | |
| 2006/0151494 | A1 | 7/2006 | Nakamura | |
| 2007/0181583 | A1 * | 8/2007 | Zacharias | 220/563 |
| 2008/0014390 | A1 | 1/2008 | Scott | |
| 2008/0203623 | A1 | 8/2008 | Fujitaka | |
| 2009/0230128 | A1 | 9/2009 | Watson | |
| 2011/0062163 | A1 * | 3/2011 | Hewkin | 220/562 |

FOREIGN PATENT DOCUMENTS

| | | |
|---|---|---|
| EP | 1 605 156 A1 | 12/2005 |
| JP | 8-118971 A | 5/1996 |

OTHER PUBLICATIONS

European Search Report mailed Sep. 4, 2012, issued in corresponding European Application No. EP 12 17 1334, filed Jun. 6, 2012. 2 pages.

* cited by examiner

*Primary Examiner* — Stephen K Cronin
*Assistant Examiner* — Joseph Dallo
(74) *Attorney, Agent, or Firm* — Christensen O'Connor Johnson Kindness PLLC

(57) ABSTRACT

A fuel cooler assembly formed in accordance with the present disclosure includes an outer tank shell, an inner tank shell disposed within the outer tank shell, and an access opening defined in the inner tank shell at a first location on the fuel tank. A fuel return cavity is defined between the inner and outer tanks shells, which is in fluid communication with the access opening. A fuel return opening is formed within the outer tank shell, which is in fluid communication with the fuel return cavity at a second location on the fuel tank.

20 Claims, 5 Drawing Sheets

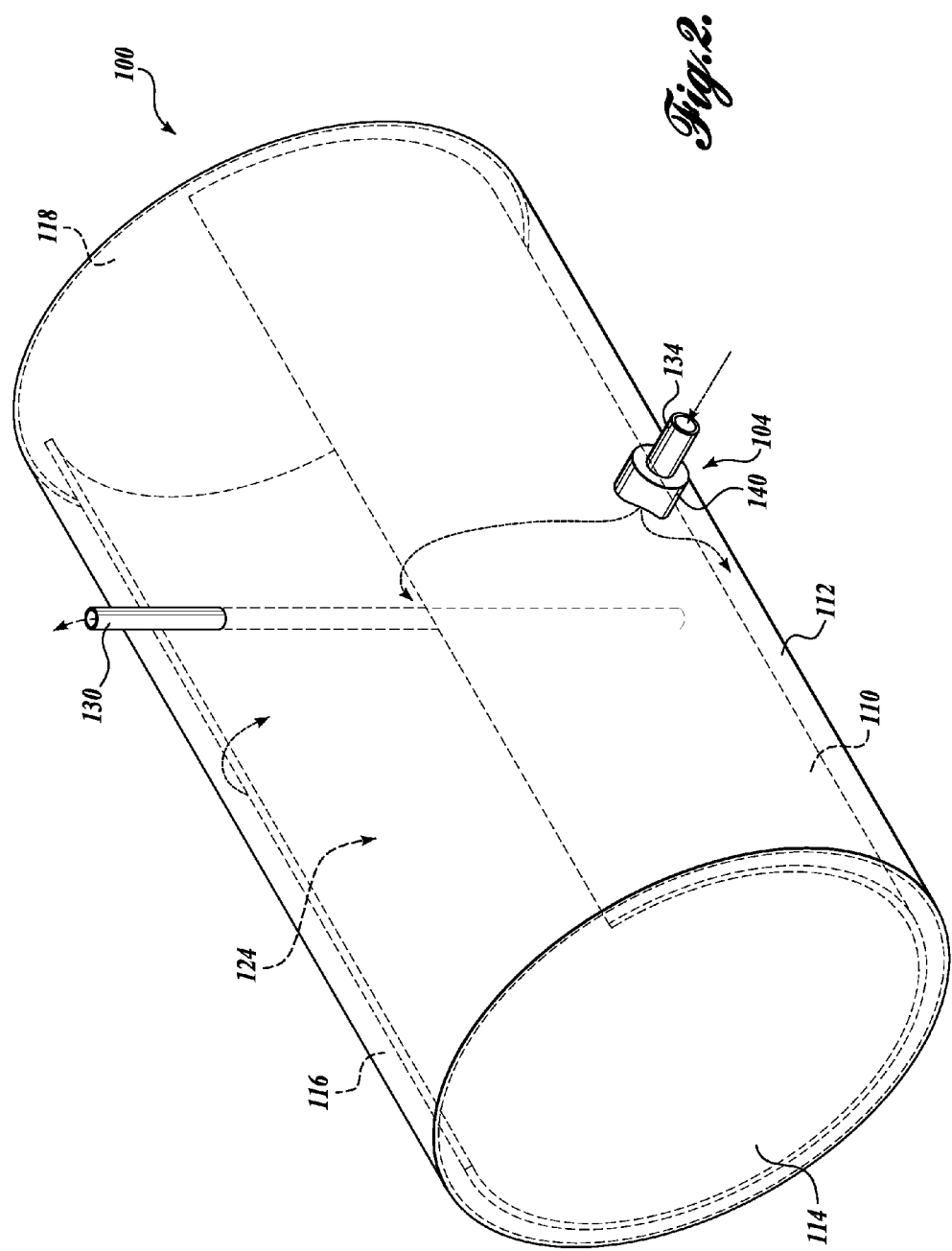

FUEL COOLER ASSEMBLY

BACKGROUND

A typical fuel supply system for a heavy duty vehicle includes several components, including a fuel tank, a fuel supply line for delivering fuel to the engine, a fuel return line for returning excess fuel to the tank that is not required for engine power requirements, and a fuel cooling system for cooling the fuel returned to the tank.

Referring to FIG. 1, a cross-sectional view of a prior art fuel tank 10 for a heavy duty vehicle is depicted. The fuel tank 10 of a heavy duty vehicle is typically configured as a cylindrical tank fabricated from aluminum sheet with welded aluminum ends. Fuel 12 is stored within the tank 10, and it is supplied to the engine via a fuel supply line 14. Excess fuel is returned from the engine through a fuel return line 18. The fuel return line 18 enters the top of the fuel tank 10 and deposits the returned fuel near the bottom of the tank below the fuel level in the tank.

The returned fuel is normally at a higher temperature than the fuel stored within the tank, and the returned fuel causes the bulk temperature of the fuel stored within the tank to increase. In some applications, this increase in fuel temperature can become problematic for efficient engine operation and requires the addition of an active or passive fuel cooler to control fuel temperature delivered to the engine.

An active fuel cooler is typically configured as an assembly separate from the fuel tank, and it often includes separate mounting hardware and fuel piping. The active fuel coolers may be mounted to the engine radiator assembly to take advantage of the existing engine cooling fan. Alternatively, separate cooling fans may be used in conjunction with the active fuel cooler to provide the necessary fuel cooling. As can be appreciated, active fuel coolers increase the cost and complexity of vehicle assembly.

A passive fuel cooler may be defined in part by the fuel tank itself. For instance, the fuel within the tank may be cooled by temperature conductance through the shell of the tank, wherein the heat is released to the surrounding air by convection. However, the fuel level drops in the tank as the fuel is consumed by the engine. As the fuel level drops, the fuel within the tank is less capable of being cooled by the surrounding air due to the reduction in heat transfer area of the tank shell in contact with the fuel.

Thus, it is desired to provide an improved fuel cooler for a vehicle tank having the cooling capabilities of an active fuel cooler and the simplicity of a passive fuel cooler.

SUMMARY

A fuel cooler assembly formed in accordance with the present disclosure includes an outer tank shell, an inner tank shell disposed within the outer tank shell, and an access opening defined in the inner tank shell at a first location on the fuel tank. A fuel return cavity is defined between the inner and outer tanks shells, which is in fluid communication with the access opening. A fuel return opening is formed within the outer tank shell, which is in fluid communication with the fuel return cavity at a second location on the fuel tank.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of the present disclosure will become more readily appreciated by reference to the following detailed description, when taken in conjunction with the accompanying drawings, wherein:

FIG. 2 is an isometric view of a fuel tank having a fuel cooler assembly formed in accordance with an exemplary embodiment of the present disclosure;

DETAILED DESCRIPTION

A fuel tank 100 having a fuel cooler assembly 104 formed in accordance with an exemplary embodiment of the present disclosure may best be seen by referring to FIG. 2. The fuel cooler assembly 104 is configured to help passively cool fuel returned to the fuel tank 100 from the engine without the use of active components, such as a radiator or fan. However, it should be appreciated that the fuel cooler assembly 104 may be used in combination with one or more active cooling system components to help increase the cooling of the fuel being returned to the fuel tank 100.

As will become appreciated from the description below, the fuel cooler assembly 104 is defined in part by a portion of the fuel tank 100. Therefore, it should be appreciated that the fuel cooler assembly 104 should be understood as including a portion or all of the fuel tank 100. Moreover, the fuel cooler assembly 104 will be hereinafter described with reference to a fuel tank 100 suitable for use with a heavy duty vehicle, such as a heavy duty truck. However, the fuel cooler assembly 104 may instead be configured for use with any suitable fuel tank; and therefore, the descriptions and illustrations herein should not be construed as limiting the scope of the claimed subject matter.

Figure 1:
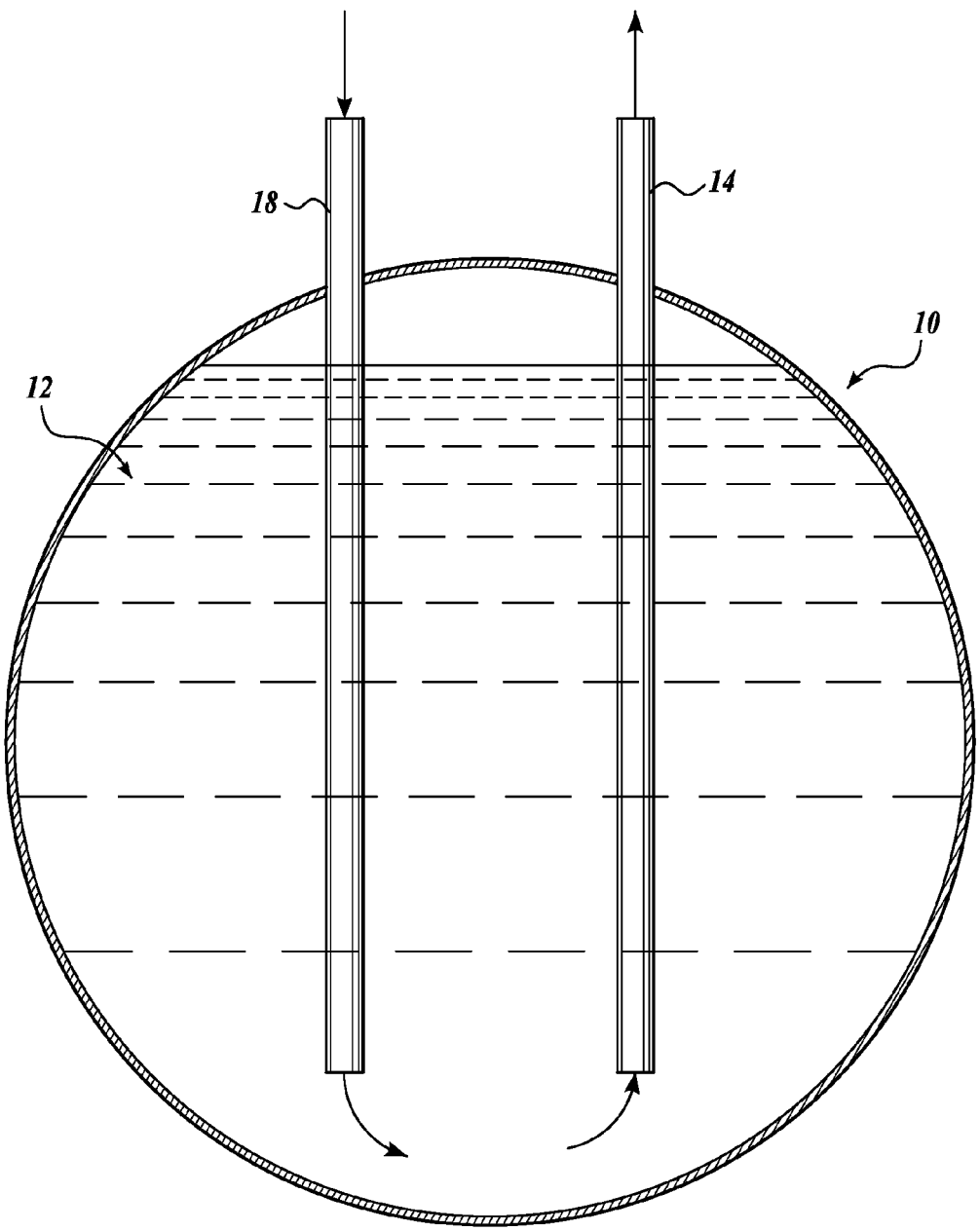
FIG. 1 is a prior art fuel tank having a passive fuel cooler.
Figure 3A:
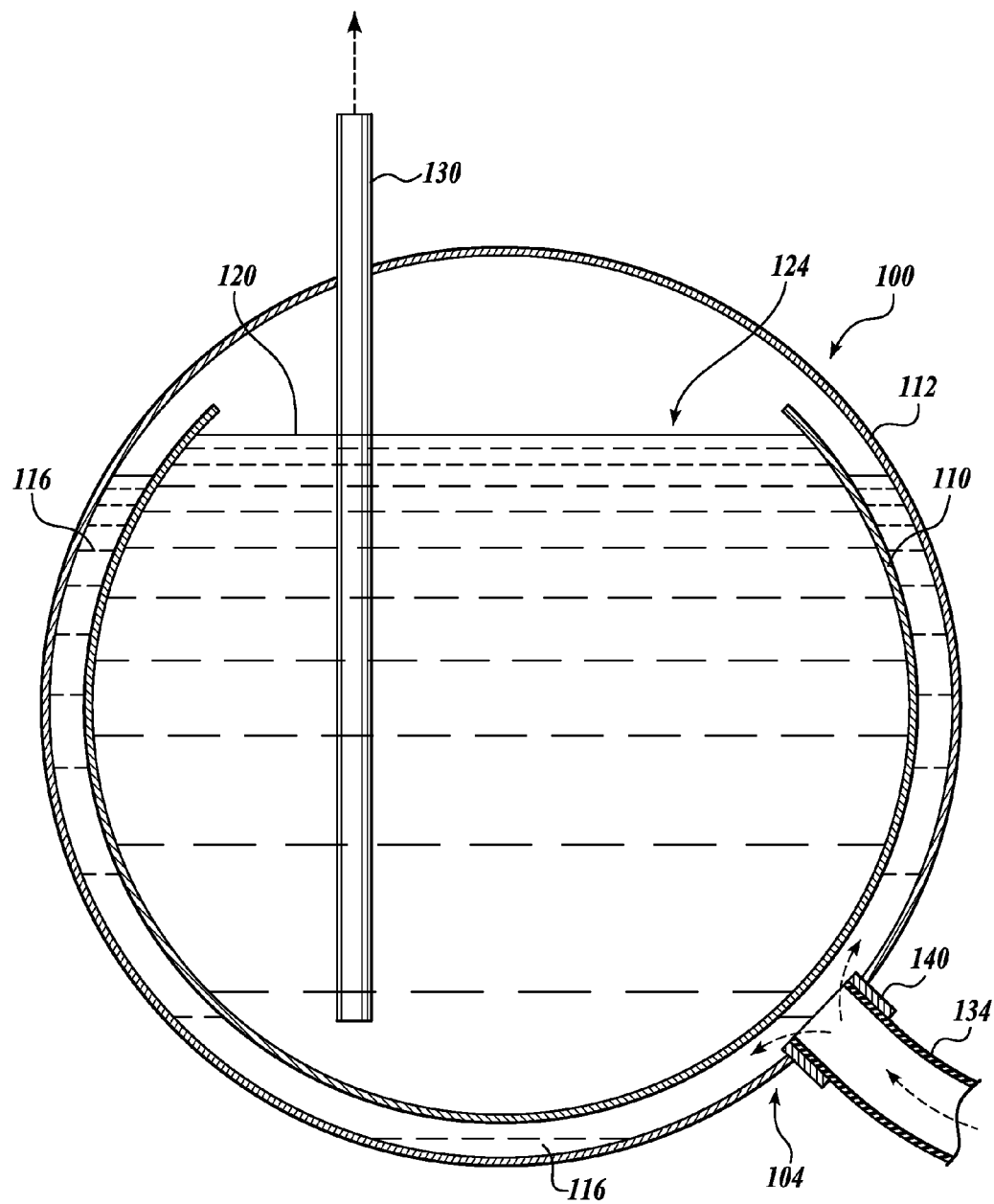
FIG. 3A is a cross-sectional view of the fuel tank and fuel cooler assembly of FIG. 2, wherein the fuel is shown at a first level.
Figure 3B:
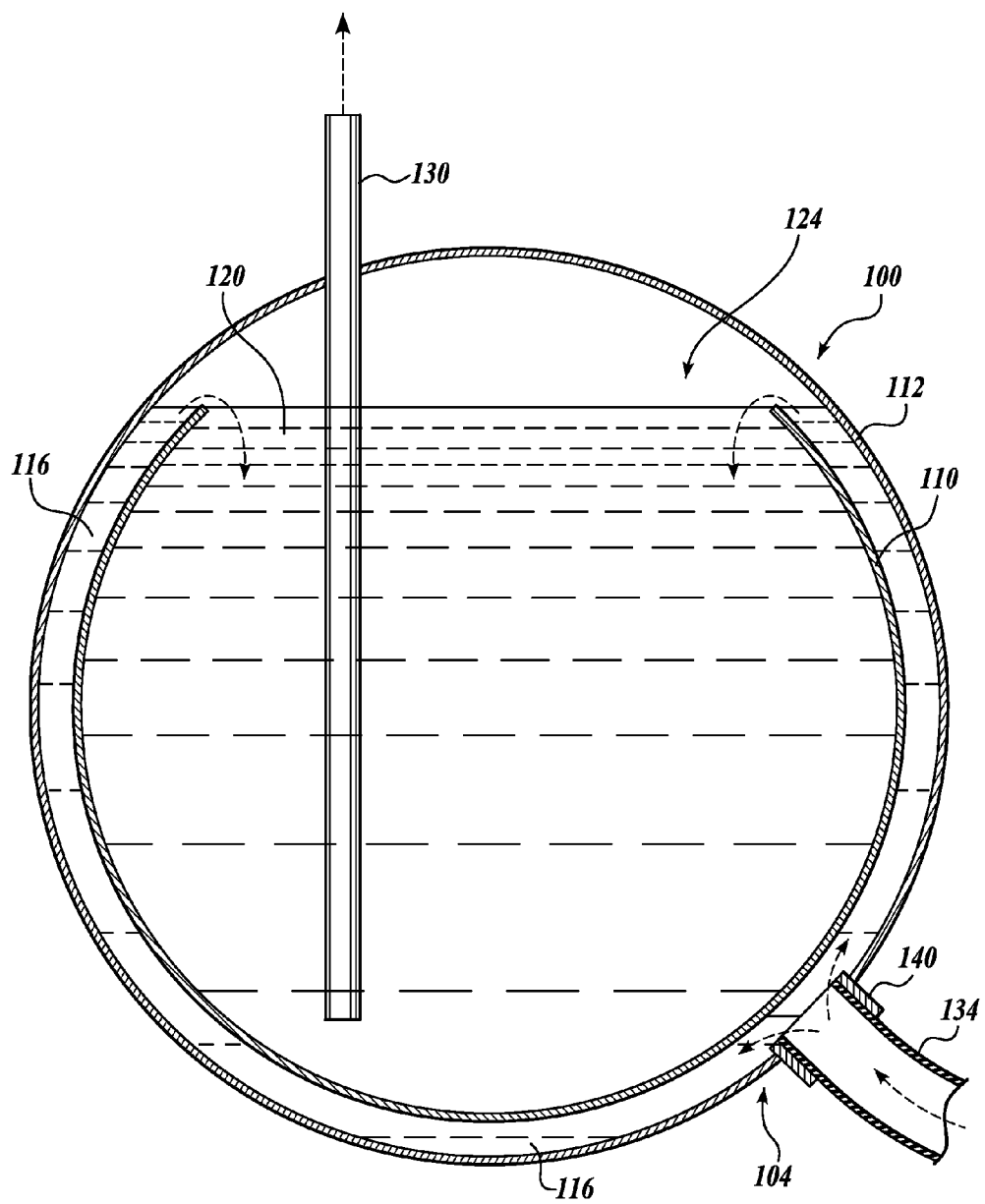
FIG. 3B is a cross-sectional view of the fuel tank and fuel cooler assembly of FIG. 2, wherein the fuel is shown at a first level.

Referring to FIGS. 2, 3A, and 3B, an exemplary embodiment of a fuel tank 100 suitable for carrying out aspects of the fuel cooler assembly 104 will first be described in detail. The fuel tank 100 is generally of a double wall design having an inner shell 110 and an outer shell 112. The inner shell 110 may be formed from a material having a lower thermal conductivity than the outer shell 112. As a specific example, the inner shell 110 may be formed from stainless steel, which has a thermal conductivity (k) of 17.5 W/m-C, and the outer shell 112 may be formed from aluminum, which has a thermal conductivity (k) of 255 W/m-C. Thus, the aluminum outer shell 112 has a much higher coefficient of heat transfer. As such, the inner shell 110 effectively acts as a thermal barrier between the inner and outer shells 110 and 112.

It should be appreciated that the inner and outer shell materials are not limited to metallic materials. The inner shell could be made from any number of composite or engineered materials with a lower coefficient of heat transfer to act as a thermal barrier.

The double wall design of the fuel tank 100 may be any shape and configuration suitable for the application or vehicle. In the depicted embodiment, the fuel tank 100 is generally cylindrical in shape such that it has a substantially circular cross-section, similar to a typical fuel tank of a heavy duty vehicle. In particular, the inner shell 110 is substantially cylindrical in shape and is sized to hold the bulk fuel in the fuel tank 100, and the outer shell 112 is substantially cylindrical in shape and concentrically disposed around the inner shell 110 to define a fuel return cavity 116 between an outer surface of the inner shell 110 and an inner surface of the outer shell 112.

Referring specifically to FIG. 2, the inner and outer shells 110 and 112 may be enclosed at their ends by first and second opposing end caps 114 and 118. In this manner, the inner and outer shells 110 and 112 and the end caps 114 and 118 enclose fuel 120 stored within the fuel tank 100. The first and second end caps 114 and 118 may be made from any suitable material, such as stainless steel, aluminum, or other materials.

The first and second end caps 114 and 118 may be secured to the opposing transverse edges of the inner and outer shells 110 and 112 in any suitable manner. For instance, the end caps 114 and 118 may be secured to the inner and outer shells 110 and 112 by welding, by integrally forming the end caps 114 and 118 as a part of the inner and outer shells 110 and 112, by fasteners, etc. If the material of the first and second end caps 114 and 118 differ from the material of the inner and/or the outer shell 110 and 112, the first and second end caps 114 and 118 may be joined with the inner and/or outer shell 110 and 112 by friction stir welding (FSW).

With the first and second end caps 114 and 118 secured to the ends of both the inner and outer shells 110 and 112, the end caps 114 and 118 limit the fuel return cavity 116 to the area between the curved cylindrical surfaces of the inner and outer shells 110 and 112. In the alternative, the first and second end caps 114 and 118 may be secured only to the ends of the outer shell 112. Third and fourth end caps (not illustrated) may be secured to the transverse opposing ends of the inner shell 110 and spaced inwardly from the first and second end caps 114 and 118. In this alternative embodiment, the fuel return cavity 116 would also extend between the end caps of the inner and outer shells 110 and 112.

As generally described above, the inner shell 110, which is concentrically disposed within the outer shell 112, has a cross-sectional diameter smaller in size than the outer shell 112 to form a gap or a fuel return cavity 116 between the inner and outer shells 110 and 112. The fuel return cavity 116 is in communication with the interior of the inner shell 110 (and therefore, the bulk fuel stored within the tank 110) through an access opening 124 in the inner shell 110. The access opening 124, which may be any suitable shape and size, is formed at or near the top of the inner shell 110. In the depicted embodiment, the access opening 124 is a single elongated opening that extends along the length of the top of the inner shell 110 and intersects with the end caps 114 and 118 of the fuel tank 100.

If third and fourth end caps are secured to the inner shell 110, the third and fourth end caps could be similar in cross-sectional shape to the inner shell 110 such that the access opening 124 intersects the third and fourth end caps. As such, the fuel return cavity 116 defined between the end caps of the inner and outer shells 110 and 112 would be in communication with the interior of the inner shell 110 through the access opening 124.

It should be appreciated that the access opening 124 may instead be defined by one or more openings of various shapes and configurations. For instance, the access opening 124 may be defined by a plurality of openings such as perforated holes, slots, louvers or other convenient shapes coincident with the design of the inner shell 110 and/or the fuel tank 100. In that regard, the access opening(s) 124 may extend a short distance or along the entire length of the top of the inner shell 110.

Regardless of configuration, fuel contained within the fuel return cavity 116 does not pass into the interior of the inner shell 110 unless and until the fuel level within the fuel return cavity 116 reaches the level of the access opening 124. For example, referring to FIG. 3A, the fuel level within the fuel return cavity 116 is below the access opening 124 in the inner shell 110. As such, the fuel within the fuel return cavity 116 remains at least temporarily isolated from the bulk fuel within the inner shell 110.

Referring to FIG. 3B, when the fuel level rises within the fuel return cavity 116 and reaches the access opening 124, the fuel pours into the interior of the inner shell 110 through the access opening 124 and intermixes with the fuel within the inner shell 110.

The fuel tank 100 is in fluid communication with a fuel supply line 130 configured to transport fuel from the fuel tank 100 to the engine (not shown), and the fuel tank 100 is also in fluid communication with a fuel return line 134 is configured to transport fuel from the engine to the fuel tank 100. The fuel supply line 130 is any suitable conduit or tube suitable to transport fuel. The fuel supply line 130 extends into the fuel tank 100 through an opening in the outer shell 110, and the fuel supply line 130 extends down into the inner shell 110 by passing through the access opening 124 (or another suitable opening in the inner shell 110). The fuel supply line 130 terminates near a bottom interior surface of the inner shell 110 such that the fuel supply line 130 may extract fuel from the inner shell 110 even when the fuel level is low.

The fuel return line 134 is any suitable conduit or tube suitable to transport excess fuel from the engine to the fuel tank 100. The fuel return line 134 extends from the engine and is in fluid communication with the fuel return cavity 116 through a suitable opening or fitting 140 secured to or otherwise formed on the outer shell 112. The fitting 140 may be any suitable substantially air- and fluid-tight fitting configured to place the fuel return line 134 into fluid communication with the fuel return cavity 116, such as an automatic or manual one-way valve or any other suitable fitting. Alternatively, the fitting 140 may be defined by a manifold with a single opening or a plurality of openings that fluidly communicate with the fuel return cavity 116.

The fitting 140 may be positioned at or near the bottom of the fuel tank 100. In this manner, fuel deposited or returned into the fuel return cavity 116 is isolated from the bulk fuel stored within the inner shell 110 until the returned fuel is forced upwardly within the fuel return cavity 116 and it reaches the level of the access opening 124.

Alternatively, the fitting 140 may be positioned near the side or top portion of the fuel tank 100 to accommodate various configurations of the fuel supply system. For instance, the fitting 140 may be positioned near the top of the fuel tank 100 such that the fitting 140 can be easily connected to a fuel return line 134 extending from an adjacent fuel supply system component, such as the vehicle engine. In this alternative configuration, a tube or supply line may extend from the fitting 140 into the interior of the fuel return cavity (essentially forming an interior extension of the fuel return line 134) that would be in fluid communication with the fuel return cavity 116 near the bottom of the fuel tank 100. In this manner, the fitting 140 could be positioned near the top or side of the fuel tank 100, yet the returned fuel would still be directed toward the bottom of the tank upon entry. As such, the returned fuel would still need to travel upwardly within the fuel return cavity 116 to reach the access opening 124.

When the returned fuel reaches the access opening 124, the returned fuel enters the inner shell 110 and intermixes with the bulk fuel stored within the inner shell 110. By temporarily isolating the returned fuel from the bulk fuel in the inner shell 110, the hotter returned fuel coming from the engine is not immediately intermixed with the cooler bulk fuel stored within the inner shell 110, helping to prevent the bulk fuel temperature from rising.

Moreover, with the fuel return cavity 116 defined near the exterior of the fuel tank 110, the returned fuel can be cooled by heat transfer between the returned fuel and the outer shell 112 and heat transfer between the outer shell 112 and the ambient cooler fluid (e.g., air) surrounding the outer shell 112. In addition, as fuel is consumed and the fuel level within the inner shell 110 drops, the heat transfer area of the returned fuel in contact with the outer shell 112 is not reduced, as would be the case with a prior art fuel tank. In fact, cooling of the returned fuel will effectively increase as the fuel level within the inner shell 110 decreases because the heat transfer area between the bulk fuel and the inner shell 112 is reduced. In other words, the returned fuel can additionally benefit from heat transfer through the portion of the inner shell 110 not in contact with the bulk fuel within the inner shell 110.

Figure 4:
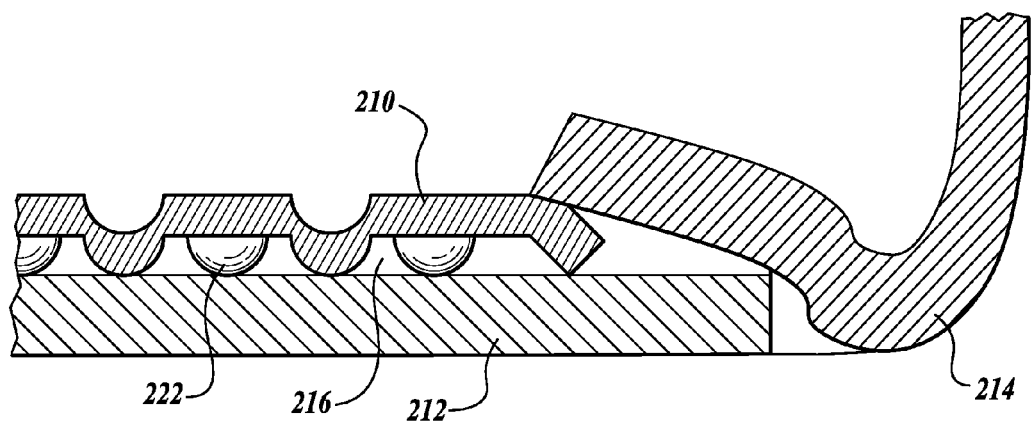
FIG. 4 is a cross-sectional view of an alternate embodiment of a portion of the fuel cooler assembly of FIG. 1.

Referring to FIG. 4, an alternative embodiment of an inner shell 210 will be hereinafter described. The inner and outer shells 210 and 212, which are shown enclosed at their ends with an end cap 214, are substantially identical to the inner and outer shells 110 and 112 described above except for the differences hereinafter provided.

The inner shell 210 includes a plurality of protrusions 222 extending from the outer surface of the inner shell 210 into the fuel return cavity 216 to increase the turbulent flow of the fuel being deposited into the fuel return cavity 216. The protrusions 222 may extend either partially into the fuel return cavity 216 or may be instead be sized to engage the inner surface of the outer shell 212, as shown in FIG. 4. If the protrusions 222 engage the inner surface of the outer shell 212, the protrusions 222 also help define the width of the gap or fuel return cavity 216 between the inner and outer shells 210 and 212. It should be appreciated that the protrusions may instead be formed on the interior surface of the outer shell 212 in addition to or in lieu of being formed on the outer surface of the inner shell 210 without departing from the scope of the present disclosure.

The protrusions 222 may be arranged in any suitable pattern and spatial arrangement to provide the desired amount of turbulent flow of the fuel flowing within the fuel return cavity 216. As can be appreciated by one of ordinary skill in the art, by increasing the turbulent flow of the fuel within the fuel return cavity 216, the returned fuel can cool at an increased rate in comparison to the cooling rate of laminar flow.

In yet another alternative embodiment, the inner and/or outer shells may include protrusions extending into the fuel return cavity that define fuel flow passages to encourage the incoming return fuel to travel a greater distance as it rises in the fuel return cavity. The passages would extend generally from the fitting of the fuel return line to the access opening in the inner shell. In other words, the passages would be in fluid communication with the fuel return line and the access opening to allow fuel to flow from the fuel return line to the access opening. By traveling a greater distance, the returned fuel will flow across a greater surface area of the outer shell, thereby increasing the cooling capacity of the outer shell (without increasing the surface area of the outer shell) to help further decrease the temperature of the returned fuel.

As noted above, the inner and outer shells 110 and 112 are made with different materials having dissimilar heat transfer properties. In particular, the outer shell 112 has a much higher coefficient of heat transfer than the inner shell 110. Thus, the heat transfer of the returned fuel within the fuel return cavity 116 is biased toward the external surface of the outer shell 112 and to the ambient fluid surrounding the outer shell 112. As such, the cooling effect of the returned fuel does not substantially increase the temperature of the bulk fuel within the inner shell 110.

Likewise, with the inner shell 110 having a much lower coefficient of heat transfer than the outer shell 112, the inner shell 110 effectively acts as a thermal barrier between the returned fuel within the fuel return cavity 116 and the bulk fuel within the inner shell 110. In this manner, minimal heat transfer occurs between the bulk fuel and the inner shell 110, thereby helping to prevent an increase in temperature in the returned fuel within the fuel return cavity 116.

It can be appreciated from the foregoing description and illustrations herein that the fuel cooler assembly 104 can reduce or eliminate the need for an active fuel cooling system, thus reducing the cost and complexity of a vehicle build. However, as stated previously, it should be appreciated that the fuel cooler assembly 104 may be used in combination with one or more active cooling system components to additionally help cool the fuel being returned to the fuel tank 100. For example, the fuel tank 100 may be positioned in an area of air flow or air may be ducted to the fuel tank 100 from vehicle forward motion. In such a configuration, the air convection would be increased, which adds to the cooling capacity of the fuel cooler assembly 104.

While illustrative embodiments of the fuel cooler assembly 104 have been illustrated and described, it will be appreciated that various changes can be made therein without departing from the spirit and scope of the present disclosure.

The embodiments of the present disclosure in which an exclusive property or privilege is claimed are defined as follows:

1. A fuel cooler assembly, comprising:
   (a) an outer tank shell;
   (b) an inner tank shell disposed within the outer tank shell;
   (c) an access opening defined in the inner tank shell at a first location on the fuel tank;
   (d) a fuel return cavity defined between the inner and outer tanks shells, the fuel return cavity in fluid communication with the access opening; and
   (e) a fuel return opening formed within the outer tank shell, the fuel return opening in fluid communication with the fuel return cavity at a second location on the fuel tank.

2. The fuel cooler assembly of claim 1, wherein the fuel return opening is disposed near a bottom of the fuel tank, and the access opening is defined near a top of the fuel tank.

3. The fuel cooler assembly of claim 2, further comprising a fuel return line in communication with the fuel return opening, wherein the fuel return line is configured to transport fuel to the fuel tank from a fuel source.

4. The fuel cooler assembly of claim 3, wherein the fuel return line extends into the fuel return cavity and is configured to deposit fuel into a portion of the fuel return cavity near a bottom of the fuel tank.

5. The fuel cooler assembly of claim 3, further comprising a fuel supply opening formed in the outer shell and a fuel supply line in communication with the fuel supply opening, wherein the fuel supply line is configured to transport fuel from the fuel tank to a fuel source.

6. The fuel cooler assembly of claim 3, wherein the fuel source is an engine.

7. The fuel cooler assembly of claim 1, further comprising a plurality of protrusions formed on at least one of the inner and outer shells, the protrusions extending at least partially into the fuel return cavity.

8. The fuel cooler assembly of claim 7, wherein the protrusions define one or more fluid passageways within the fuel return cavity, the fluid passageways in fluid communication with the fuel return opening and the access opening.

9. A fuel cooler assembly, comprising:
(a) an outer tank shell made from a first material having a first coefficient of heat transfer;
(b) an inner tank shell disposed within the outer tank shell, the inner tank shell formed from a second material having a second coefficient of heat transfer lower than the first coefficient of heat transfer;
(c) an access opening defined in the inner tank shell at a first location on the fuel tank; and
(d) a fuel return cavity defined between the inner and outer tanks shells, the fuel return cavity in fluid communication with the access opening; and
(e) a fuel return opening formed within the outer tank shell, the fuel return opening in fluid communication with the fuel return cavity at a second location on the fuel tank.

10. The fuel cooler assembly of claim 9, wherein the fuel return opening is disposed near a bottom of the fuel tank, and the access opening is defined near a top of the fuel tank.

11. The fuel cooler assembly of claim 9, further comprising a fuel return line in communication with the fuel return opening, wherein the fuel return line is configured to transport fuel to the fuel tank from a fuel source.

12. The fuel cooler assembly of claim 11, wherein the fuel return line extends into the fuel return cavity and is configured to deposit fuel into a portion of the fuel return cavity near a bottom of the fuel tank.

13. The fuel cooler assembly of claim 11, further comprising a fuel supply opening formed in the outer shell and a fuel supply line in communication with the fuel supply opening, wherein the fuel supply line is configured to transport fuel from the fuel tank to a fuel source.

14. The fuel cooler assembly of claim 13, wherein a portion of the fuel supply line extends through the outer shell and into an interior portion of the inner shell.

15. The fuel cooler assembly of claim 12, wherein the fuel source is an engine.

16. The fuel cooler assembly of claim 9, further comprising a plurality of protrusions formed on at least one of the inner and outer shells, the protrusions extending at least partially into the fuel return cavity.

17. The fuel cooler assembly of claim 16, wherein the protrusions define one or more fluid passageways within the fuel return cavity, the fluid passageways in fluid communication with the fuel return opening and the access opening.

18. A fuel cooler assembly for a vehicle fuel tank, the vehicle having an engine, the fuel cooler assembly comprising:
(a) an outer tank shell made from a first material having a first coefficient of heat transfer;
(b) an inner tank shell disposed within the outer tank shell, the inner tank shell having an interior, the inner tank shell made from a second material having a second coefficient of heat transfer lower than the first coefficient of heat transfer;
(c) an access opening defined in the inner tank shell at an upper portion of the fuel tank;
(d) a fuel supply line in communication with the interior of the inner shell, wherein the fuel supply line is configured to transport fuel from the fuel tank to the engine;
(e) a fuel return cavity defined between the inner and outer tanks shells, the fuel return cavity in fluid communication with the access opening; and
(f) a fuel return line in fluid communication with the engine and the fuel return cavity at a bottom portion of the fuel tank, wherein the fuel return line is configured to transport fuel from the engine to the fuel return cavity.

19. The fuel cooler assembly of claim 18, further comprising a plurality of protrusions formed on at least one of the inner and outer shells, the protrusions extending at least partially into the fuel return cavity.

20. The fuel cooler assembly of claim 18, wherein the protrusions define one or more fluid passageways within the fuel return cavity, the fluid passageways in fluid communication with the fuel return line and the access opening.

* * * * *